(12) United States Patent
Kamiya et al.

(10) Patent No.: US 9,444,285 B2
(45) Date of Patent: Sep. 13, 2016

(54) CHARGE CONTROLLER FOR VEHICLE

(71) Applicant: DENSO CORPORATION, Kariya, Aichi-pref. (JP)

(72) Inventors: Kei Kamiya, Anjo (JP); Kenji Yamamoto, Nagoya (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 361 days.

(21) Appl. No.: 13/903,383

(22) Filed: May 28, 2013

(65) Prior Publication Data

US 2013/0320911 A1  Dec. 5, 2013

(30) Foreign Application Priority Data

Jun. 1, 2012 (JP) .................................. 2012-125977
Sep. 7, 2012 (JP) .................................. 2012-197864

(51) Int. Cl.
*H02J 7/00* (2006.01)
*H02J 7/35* (2006.01)
(Continued)

(52) U.S. Cl.
CPC ................. *H02J 7/35* (2013.01); *B60L 3/003* (2013.01); *B60L 8/003* (2013.01); *B60L 11/1803* (2013.01); *B60L 11/1812* (2013.01); *B60L 11/1816* (2013.01); *B60L 11/1861* (2013.01);
(Continued)

(58) Field of Classification Search
CPC .................................................. H02J 7/00

USPC .......................................................... 320/101
See application file for complete search history.

(56) References Cited

U.S. PATENT DOCUMENTS

2010/0318252 A1* 12/2010 Izumi ....................... B60K 6/28
701/22
2011/0187184 A1* 8/2011 Ichikawa ................ B60L 1/003
307/10.1
(Continued)

FOREIGN PATENT DOCUMENTS

JP         7-123510         5/1995
JP         09-035757        2/1997
(Continued)

OTHER PUBLICATIONS

Office Action (4 pages) dated Apr. 30, 2014 issued in corresponding Japanese Application No. 2012-197864 and English translation (4 pages).

(Continued)

*Primary Examiner* — Robert Grant
*Assistant Examiner* — Harry O'Neill-Becerril
(74) *Attorney, Agent, or Firm* — Nixon & Vanderhye P.C.

(57) ABSTRACT

A charge controller is used for a vehicle equipped with a rotating machine, a main battery for storing electrical power supplied to the rotating machine, a power storage device, and a solar power generator. The charge controller includes a power converter, a first charging section, a step-up section, and a second charging section. The power converter is interposed between the solar power generator and the storage device. The first charging section controls the power converter to store electrical power generated by the solar power generator in the storage device. The step-up section steps up and outputs the power stored in the power storage device to the main battery. The second charging section controls the step-up section to charge the main battery with the power stored in the power storage device.

15 Claims, 14 Drawing Sheets

(51) Int. Cl.
*H02J 7/02* (2016.01)
*B60L 11/18* (2006.01)
*B60L 3/00* (2006.01)
*B60L 8/00* (2006.01)

(52) U.S. Cl.
CPC ........ *B60L11/1864* (2013.01); *B60L 11/1868* (2013.01); *H02J 7/0013* (2013.01); *H02J 7/025* (2013.01); *B60L 2210/12* (2013.01); *B60L 2210/14* (2013.01); *B60L 2210/30* (2013.01); *B60L 2210/40* (2013.01); *B60L 2240/527* (2013.01); *B60L 2240/529* (2013.01); *B60L 2240/547* (2013.01); *B60L 2240/549* (2013.01); *B60L 2240/80* (2013.01); *Y02T 10/7005* (2013.01); *Y02T 10/7044* (2013.01); *Y02T 10/7055* (2013.01); *Y02T 10/7061* (2013.01); *Y02T 10/7066* (2013.01); *Y02T 10/7072* (2013.01); *Y02T 10/7083* (2013.01); *Y02T 10/7225* (2013.01); *Y02T 10/7233* (2013.01); *Y02T 10/7241* (2013.01); *Y02T 10/92* (2013.01); *Y02T 90/127* (2013.01); *Y02T 90/14* (2013.01)

(56) References Cited

U.S. PATENT DOCUMENTS

| | | | |
|---|---|---|---|
| 2012/0133322 A1* | 5/2012 | Walsh | B60L 8/00 320/101 |
| 2012/0136534 A1 | 5/2012 | Walsh et al. | |
| 2012/0306266 A1 | 12/2012 | Ohnuki | |

FOREIGN PATENT DOCUMENTS

| | | |
|---|---|---|
| JP | 11-98709 | 4/1999 |
| JP | 2005-117824 | 4/2005 |
| JP | 2008-306821 | 12/2008 |
| JP | 2012-75241 | 4/2012 |
| JP | 2012-75242 | 4/2012 |

OTHER PUBLICATIONS

Office Action (9 pages) dated Nov. 18, 2015, issued in corresponding Chinese Application No. 201310213668.X and English translation (13 pages).

\* cited by examiner

CHARGE CONTROLLER FOR VEHICLE

CROSS REFERENCE TO RELATED APPLICATION

This application is based on Japanese Patent Application No. 2012-125977 filed on Jun. 1, 2012 and No. 2012-197864 filed on Sep. 7, 2012, the contents of which are incorporated herein by reference.

FIELD

The present disclosure relates to a charge controller for a vehicle equipped with a solar power generator and a battery for storing electrical power that powers a rotating machine of the vehicle.

BACKGROUND

JP-A-7-123510 discloses a charge system for an electric vehicle equipped with a main battery for storing electrical power to drive the vehicle and an auxiliary battery having a voltage lower than the main battery. In the charging system, when an output voltage of the solar panel is high, the auxiliary battery is charged directly. In contrast, when the output voltage is low, the main battery is charged by stepping up the output voltage.

SUMMARY

The present inventors find out that when the above technique is applied to hybrid or electric vehicles, the use efficiency of power generated by the solar panel becomes excessively low. Specifically, when a vehicle battery for storing electrical power that powers a rotating machine of a vehicle is charged, a lot of electronic devices, including a monitor device for monitoring the state of charge of the battery, are powered ON. Accordingly, power consumed by the electronic devices is large. Further, when an output voltage of a solar panel is small, output power of the solar panel is small. Under this circumstance, if the battery is charged by stepping up the power generated by the solar panel, the amount of power consumed by the electronic devices may exceed the amount of power generated by the solar panel.

In view of the above, it is an object of the present disclosure to provide a charge controller for suitably controlling solar power generation in a vehicle equipped with a solar power generator and a battery for storing electrical power that powers a rotating machine of the vehicle.

According to an aspect of the present disclosure, a charge controller is used for a vehicle equipped with a rotating machine, a main battery for storing electrical power supplied to the rotating machine, a power storage device, and a solar power generator. A maximum storage capacity of the power storage device is smaller than a maximum storage capacity of the main battery. The charge controller includes a power converter, a first charging section, a step-up section, and a second charging section. The power converter is interposed between the solar power generator and the storage device. The first charging section controls the power converter to store electrical power generated by the solar power generator in the storage device. The step-up section steps up and outputs the power stored in the power storage device to the main battery. The second charging section controls the step-up section to charge the main battery with the power stored in the power storage device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A system including a charge controller according to a first embodiment of the present disclosure is described below with reference to FIG. 1. The charge controller can change a vehicle with power from an external power source (e.g., utility power source), which is illustrated as an AC power source by a broken line in FIG. 1.

Firstly, a summary of the system is described, and then a charging process to charge a main battery using a solar panel is described.

(Summary of System)

Figure 1:
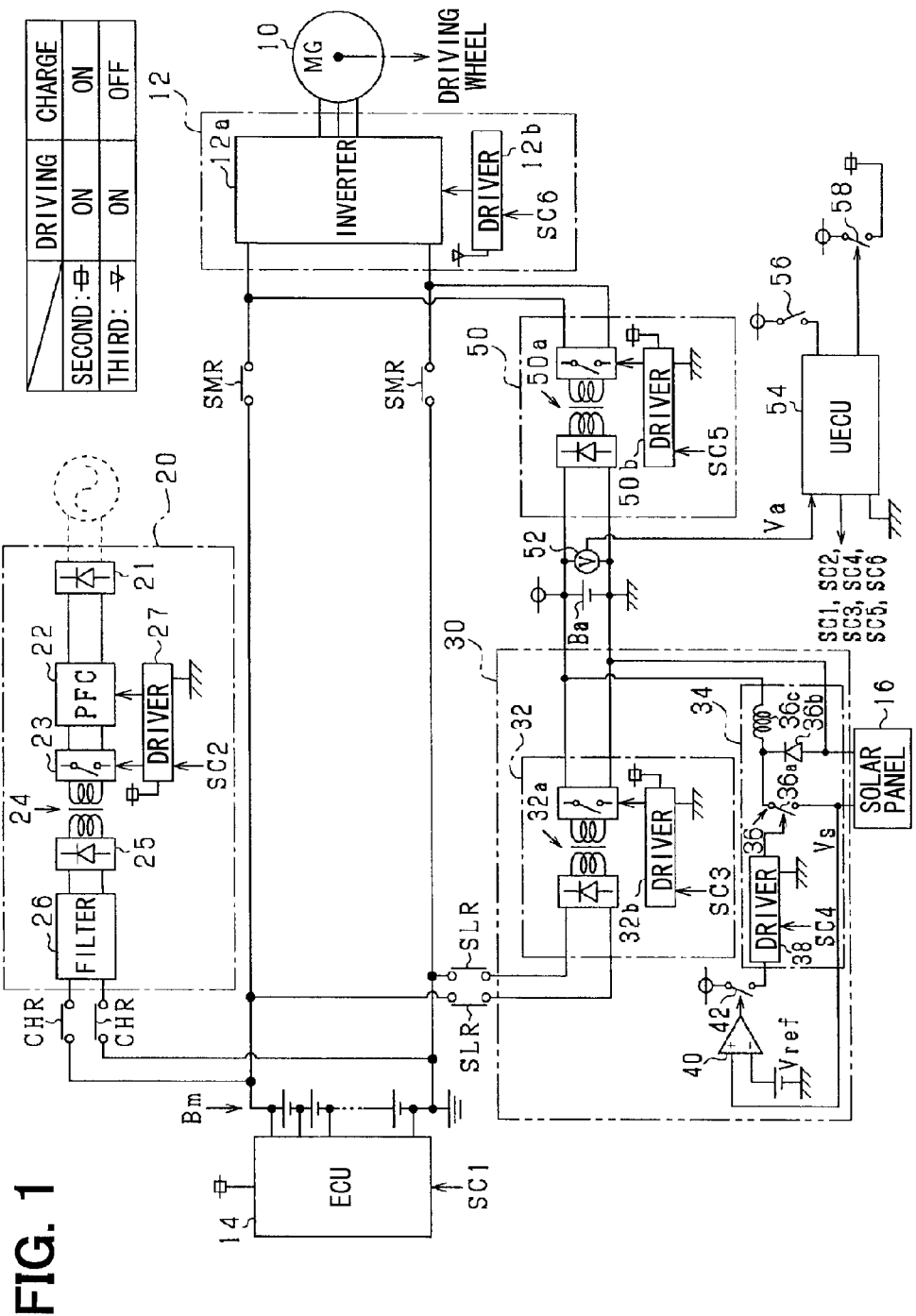
FIG. 1 is a diagram of a system according to a first embodiment of the present disclosure.

A motor generator (MG) 10 shown in FIG. 1 is a rotating machine mounted on a vehicle. The motor generator 10 is mechanically coupled to a driving wheel (not shown) of the vehicle. The motor generator 10 is connected to a power control unit 12. Specifically, the power control unit 12 includes an inverter 12a and a driver 12b for controlling and driving the inverter 12a. The motor generator 10 is connected to the inverter 12a. The inverter 12a is connected to a main battery Bm through a system main relay SMR.

The main battery Bm is insolated with respect to a chassis of the vehicle. Specifically, a potential of the chassis is a middle value between potentials of positive and negative terminals of the main battery Bm. For example, the main battery Bm can be isolated with respect to the chassis by inserting a pair of resistors between the positive and negative terminals of the main battery Bm and by connecting a connection point between the resistors to the chassis. The resistances of the resistors are set so that the main battery Bm can be isolated with respect to the chassis. The main battery Bm is an assembled battery and includes battery cells connected in series. According to the first embodiment, the battery cell is a lithium-ion secondary cell.

A state of the main battery Bm (i.e., state of each battery cell) is monitored and controlled by a battery ECU 14. Specifically, the battery ECU 14 monitors overcharge and overdischarge of each battery cell and equalizes the state of charge (SOC) of the battery cells. Thus, the battery cell is protected from the overcharge and overdischarge so that a reduction in reliability of the battery cell can be avoided. The state of charge represents a ratio of the amount of energy presently stored in the battery cell to the nominal rated capacity of the battery cell.

The positive and negative terminals of the main battery Bm are connected to a charging unit 20 through a charging relay CHR. The charging unit 20 charges the main battery Bm with power from the external power source. The charging unit 20 has a charging circuit. In the charging circuit, a rectifier circuit 21 converts the power from the external power source to direct-current (DC) power, and the DC power is inputted to a power factor correction (PFC) circuit 22 to a bridge circuit 23. The bridge circuit 23 converts the DC power to alternating-current (AC) power and applies the AC power to a primary coil of a transformer 24. A secondary coil of the transformer 24 is connected to a rectifier circuit 25 so that AC power outputted from the secondary coil of the transformer 24 can be converted to DC power. Output power of the rectifier circuit 25 is smoothed by a filter 26 and then inputted to the main battery Bm through the charging relay CHR.

The charging unit 20 has a driver 27 and performs a charging control by electronically operating switching elements of the PFC circuit 22 and the bridge circuit 23 using the driver 27. The charging unit 20 can act as a main charger in claims.

The main battery Bm is connected to a converter unit 50 through the system main relay SMR. Specifically, the converter unit 50 includes a DC-DC converter 50a and a driver 50b. The main battery Bm is connected to a primary side of the DC-DC converter 50a. A secondary side of the DC-DC converter 50a is connected to an auxiliary battery Ba. A rated capacity of the auxiliary battery Ba is smaller than that of the main battery Bm. A reference potential (i.e., potential of a negative terminal) of the auxiliary battery Ba is set as the potential of the chassis. For example, the auxiliary battery Ba can be a lead-acid battery.

According to the first embodiment, the DC-DC converter 50a is configured as a buck converter (i.e., step-down converter). That is, the DC-DC converter 50a can supply power from the main battery Bm to the auxiliary battery Ba, but cannot supply power from the auxiliary battery Ba to the main battery Bm. In FIG. 1, a symbol of a switching device is illustrated in the primary side of the DC-DC converter 50a, and a symbol of a diode is illustrated in the secondary side of the DC-DC converter 50a. The symbols are used only to show a direction in which power can be supplied. That is, a configuration of the DC-DC converter 50a is not limited to the symbols.

A solar panel 16 is connected to a solar panel ECU (SECU) 30. The SECU 30 includes a step-up unit 32 and a step-down unit 34. The step-down unit 34 steps down an output voltage Vs of the solar panel 16 and supplies the stepped-down voltage to the auxiliary battery Ba. The step-up unit 32 steps up a voltage of the auxiliary battery Ba and supplies the stepped-up voltage to the main battery Bm. The step-down unit 34 includes a step-down chopper circuit (i.e., buck converter) 36 and a driver 38. The step-down chopper circuit 36 includes a switching device 36a, a diode 36b, and an inductor 36c. When the switching device 36a is turned ON, electric current flows from the solar panel 16 to the auxiliary battery Ba so that energy of the inductor 36c can increase. In contrast, when the switching device 36a is turned OFF, the energy stored in the inductor 36c is discharged through a closed circuit constructed with the diode 36b, the inductor 36c, and the auxiliary battery Ba. It is noted that the switching device 36a is operated by the driver 38.

The step-up unit 32 includes a step-up circuit (i.e., boost converter) 32a and a driver 32b for electronically operating the step-up circuit 32a. According to the first embodiment, the step-up circuit 32a is an isolated step-up circuit. A reason for using an isolated step-up circuit is that although the potential of the negative terminal of the auxiliary battery Ba is the potential of the chassis, the main battery Bm is isolated with respect to the chassis. The step-up circuit 32a is connected to the main battery Bm through a solar relay SLR.

According to the first embodiment, the system further includes an upper ECU (UECU) 54. The UECU 54 can output command signals SC1-SC6 to control components of the system. The UECU 54 is located upstream of the SECU 30 and the power control unit 12 with respect to a user's command. A reference potential of the UECU 54 is the potential of the chassis, and the UECU 54 works with power from the auxiliary battery Ba. The supply of the power from the auxiliary battery Ba to the UECU 54 is performed when a first power switch 56 is turned ON. The first power switch 56 can be turned ON by an operation of a user. Once the first power switch 56 is turned ON so that the UECU 54 can be powered ON, the UECU 54 can keep the first power switch 56 ON. Further, in a situation where a user does not turn ON the first power switch 56, such as when the vehicle is being parked, the first power switch 56 can be periodically turned ON by a timer (not shown) or the like.

The UECU 54 has a function to electronically operate a second power switch 58. The second power switch 58 is used to switch between supply and interruption of the power of the auxiliary battery Ba to the battery ECU 14, the charging unit 20, the SECU 30, and the converter unit 50. FIG. 1 illustrates that the power of the auxiliary battery Ba can be supplied through the second power switch 58 to the battery ECU 14, the driver 27 of the charging unit 20, the driver 32b of the SECU 30, and the driver 50b of the converter unit 50.

Although not shown in the drawings, the battery ECU 14 has a high-voltage section and a low-voltage section. A reference potential of the low-voltage section is the potential of the chassis. The power of the auxiliary battery Ba is supplied through the second power switch 58 to the low-voltage section. According to the first embodiment, the high-voltage section is connected to the main battery Bm and works with power from the main battery Bm. Thus, in the battery ECU 14, even when the power of the auxiliary battery Ba to the low-voltage section is interrupted by the second power switch 58, the high-voltage section can be supplied with the power from the main battery Bm. Alternatively, the power of the auxiliary battery Ba supplied to the low-voltage section can be supplied to the high-voltage section through an isolated converter or the like.

It is noted that the interruption of the power of the auxiliary battery Ba to the battery ECU 14, the charging unit 20, the SECU 30, and the converter unit 50 does not always mean that the power is not supplied to any component of each of the battery ECU 14, the charging unit 20, the SECU 30, and the converter unit 50. For example, assuming that the driver 50b of the converter unit 50 has a backup memory (i.e., RAM) which is continuously supplied with power regardless of the condition of the second power switch 58, even when the second power switch 58 is tuned OFF so that the power to almost all components of the converter unit 50 can be interrupted, the backup memory can remain supplied with power.

The UECU 54 also has a function to electronically operate a third power switch which serves as a power switch of the power control unit 12 (i.e., driver 12b).

A power source which is turned ON when the first power switch 56 is turned ON is hereinafter sometimes referred to as the "first power source", a power source which is turned ON when the second power switch 58 is turned ON is hereinafter sometimes referred to as the "second power source", and a power source which is turned ON when the third power switch is turned ON is hereinafter sometimes referred to as the "third power source". As shown in the upper right of FIG. 1, the second power source is turned ON both in a charge mode and in a driving mode. In contrast, the third power source is turned ON only in the driving mode. That is, the third power source is OFF in the charge mode. The charge mode is used when the main battery Bm is charged with power from the external power source. The driving mode is used when the vehicle is driven.

(Charging of the Main Battery Bm with the Solar Panel 16)

The solar panel 16 can generate power regardless of whether the vehicle is driven or is parked. According to the first embodiment, the power generated by the solar panel 16 charges the main battery Bm not only when the vehicle is driven but also when the vehicle is parked. The power generated by the solar panel 16 is stored in the auxiliary battery Ba and then used to charge the main battery Bm, thereby improving the charging efficiency of the solar panel 16.

That is, to charge the main battery Bm, the battery ECU 14 needs to be powered ON. Accordingly, the second power switch 58 needs to be turned ON to power ON the battery ECU 14. In this case, when the second power switch 58 is turned ON, electronic devices including the charging unit 20 and the converter unit 50 are powered ON in addition to the battery ECU 14. Therefore, during a charging period where the main battery Bm is charged, the electronic devices consume power. The maximum amount of power generated by the solar panel 16 is set greater than the total amount of power consumed by the electronic devices. However, since the actual amount of power generated by the solar panel 16 depends on factors such as weather, there is a possibility that the total amount of power consumed by the electronic devices exceeds the actual amount of power generated by the solar panel 16. For this reason, when the second power switch 58 (i.e., the second power source) is turned ON to charge the main battery Bm with the power generated by the solar panel 16, the total amount of power stored in the vehicle may be reduced rather than increased.

To avoid such disadvantage, according to the first embodiment, the power generated by the solar panel 16 is tempo- rarily stored in the auxiliary battery Ba. It is noted that the step-down unit 34 is powered ON based on an output voltage Vs of the solar panel 16 so that the power generated by the solar panel 16 can be temporarily stored in the auxiliary battery Ba without turning ON the second power source. Specifically, the power of the auxiliary battery Ba can be supplied to the driver 38 of the step-down unit 34 through a local power switch 42. The local power switch 42 is turned ON and OFF according to an output signal of a comparator 40 which compares the output voltage Vs of the solar panel 16 with a predetermined reference voltage Vref. Specifically, when the output voltage Vs of the solar panel 16 becomes equal to or greater than the reference voltage Vref, the local power switch 42 is turned ON. The comparator 40 can act as a determining section in claims, and the step-down unit 34 can act as a first charging section in claims.

As described previously, the first power switch 56 is periodically turned ON by the timer or the like. That is, the UECU 54 can be periodically powered ON. Each time the UECU 54 is powered ON, the UECU 54 reads a detection value of a voltage sensor 52 that detects a terminal voltage Va of the auxiliary battery Ba. The UECU 54 detects the amount of power stored in the auxiliary battery Ba by the solar panel 16 based on the detection value. When the amount of power stored in the auxiliary battery Ba by the solar panel 16 exceeds a predetermined value, the UECU 54 turns ON the second power switch 58 so that the power stored in the auxiliary battery Ba can be supplied to the main battery Bm through the step-up unit 32. The step-up unit 32 can act as a step-up section in claims.

Figure 2:
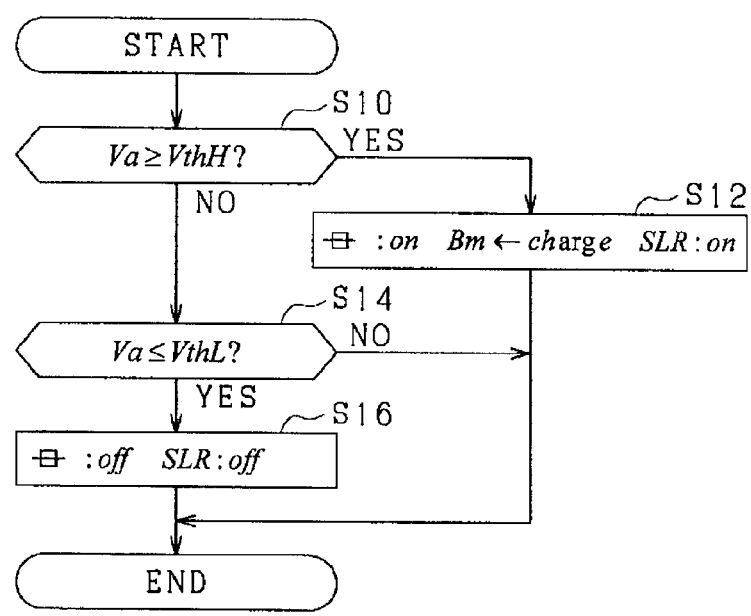
FIG. 2 is a flow chart of a charging process to charge a main battery according to the first embodiment.

FIG. 2 shows a charging process to charge the main battery Bm. While the vehicle is parked, the UECU 54 performs the charging process at a predetermined interval each time the UECU 54 is periodically powered ON.

The charging process starts at S10, where the UECU 54 determines whether the terminal voltage Va of the auxiliary battery Ba is equal to or greater than a charging start threshold VthH. That is, at S10, the UECU 54 determines whether the amount of the power stored in the auxiliary battery Ba by the solar panel 16 reaches a value high enough to charge the main battery Bm. For example, the charging start threshold VthH can be calculated by adding a normal terminal voltage of the auxiliary battery Ba observed when the vehicle is parked to a voltage value corresponding to an increase in the terminal voltage of the auxiliary battery Ba observed when the auxiliary battery Ba is adequately charged with the power generated by the solar panel 16.

If the terminal voltage Va of the auxiliary battery Ba is equal to or greater than the charging start threshold VthH corresponding to YES at S10, the charging process proceeds to S12. At S12, the UECU 54 turns ON the second power source and turns ON the solar relay SLR, thereby charging the main battery Bm. Specifically, at S12, the UECU 54 sends a charge command to each of the battery ECU 14 and the driver 32b of the step-up unit 32. The UECU 54 acts as a second charging section in claims by performing S12. It is noted that the UECU 54 remains ON after the step S12. When the UECU 54 remains ON, step S10 is performed at a predetermined interval.

In contrast, if the terminal voltage Va of the auxiliary battery Ba is less than the charging start threshold VthH corresponding to NO at S10, the charging process proceeds to S14. At S14, the UECU 54 determines whether the terminal voltage Va of the auxiliary battery Ba is equal to or less than a charging stop threshold VthL. That is, at S14, the UECU 54 determines whether to stop charging the main battery Bm. If the terminal voltage Va of the auxiliary battery Ba is equal to or less than the charging stop threshold VthL corresponding to YES at S14, the charging process proceeds to S16. At S16, the UECU 54 turns OFF both the second power switch 58 and the solar relay SLR.

After S12 and S16, or if the terminal voltage Va of the auxiliary battery Ba is greater than the charging stop threshold VthL corresponding to NO at S14, the charging process ends. Further, the first power switch 56 is turned OFF when the step S16 is finished.

Figure 3A:
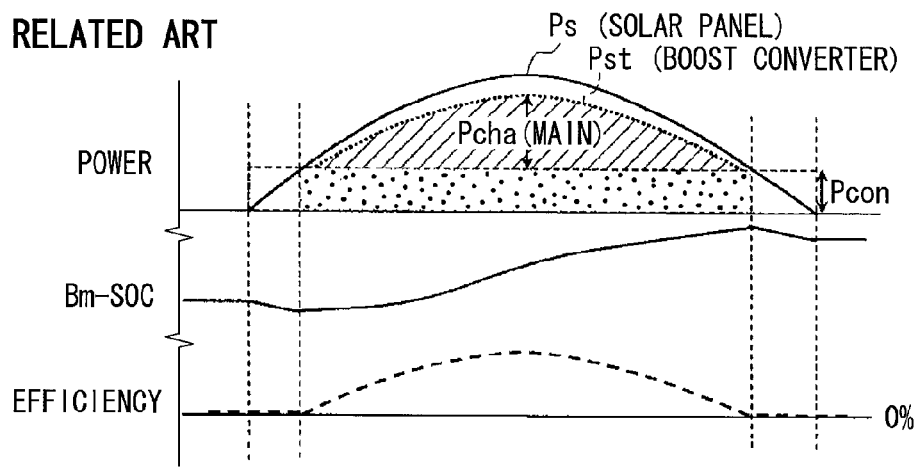
FIG. 3A is a timing chart of a system according to a comparison example.
Figure 3B:
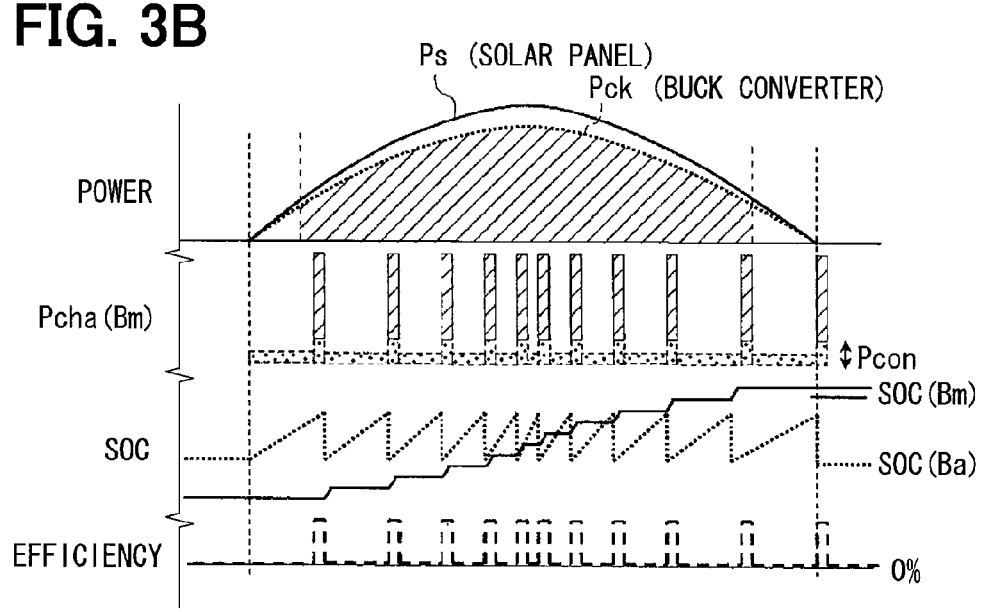
FIG. 3B is a timing chart of the system according to the first embodiment.

Advantages of the first embodiment are described below with reference to FIGS. 3A and 3B. FIG. 3A shows a comparison example where the power generated by the solar panel 16 is stored directly to the main battery Bm by using the step-up unit 32. FIG. 3B shows the first embodiment. In FIGS. 3A and 3B, each of "Pcha (MAIN)" and "Pcha (Bm)" represents power stored in the main battery Bm, "Pcon" represents power consumption in the system, "Bm-SOC" and "SOC (Bm)" represents the SOC of the main battery Bm, "SOC (Ba)" represents the SOC of the auxiliary battery Ba, "Ps (SOLAR PANEL)" represents an output power of the solar panel 16, Pst (BOOST CONVERTER) represents an output power of the step-up unit 32, and Pck (BUCK CONVERTER) represents an output power of the step-down unit 34.

In the comparison example, the output power Pst of the step-up unit 32 depends on the output power Ps of the solar panel 16. Further, since the battery ECU 14, the charging unit 20, and the SECU 30, and the converter unit 50 consume power, a large amount of power is continuously consumed in the system.

In the first embodiment, the output power Pck of the step-down unit 34 depends on the output power Ps of the solar panel 16. Further, except when the charging process to charge the battery Bm is performed, the power consumption of the system is limited to the power consumed by the step-down unit 34 and the power consumed by the UECU 54, which is periodically powered ON. To be precise, when the converter unit 50 or the charging unit 20 has a backup memory which is continuously supplied with power, the power consumption of the system is increased by the amount of power consumed by the backup memory. Further, for example, when the UECU 54 has a communication section to wirelessly communicate with a mobile device (e.g., smart key) carried by a user, the communication section is continuously supplied with power so that the power consumption of the system can be increased by the amount of power consumed by the communication section. However, the number of electronic devices to be powered ON is much smaller when the charging process is not performed than when the charging process is performed. Accordingly, the power consumption of the system is much smaller when the charging process is not performed than when the charging process is performed. Thus, the number of the electronic devices, which are powered ON to charge the battery Bm with the power generated by the solar panel 16, is reduced so that the power consumed by the electronic devices can be reduced. Accordingly, the amount of power stored in the vehicle (i.e., main battery Bm and the auxiliary battery Ba) by the solar panel 16 during the charging period can be increased as much as possible.

Therefore, according to first embodiment, a charging efficiency, which is defined as a ratio of an increase in the amount of power stored in the main battery Bm to the amount of power generated by the solar panel 16 during the charging period, can be maintained above a predetermined value. In contrast, according to the comparison example, the charging efficiency varies depending on the amount of power generated by the solar panel 16.

The advantages are described in detail below.

(1) To charge the main battery Bm with the power generated by the solar panel 16, the power generated by the solar panel 16 is temporarily stored in the auxiliary battery Ba. When the auxiliary battery Ba is charged, there is little need to monitor the state of charge of the auxiliary battery Ba. Therefore, the auxiliary battery Ba can be charged without powering ON an electronic device to monitor the state of charge of the auxiliary battery Ba. Accordingly, the amount of power consumed by such an electronic device when the auxiliary battery Ba is charged can be reduced.

(2) To charge the main battery Bm, the second power source is used. In such an approach, a change of design of the vehicle to charge the main battery Bm with the power generated by the solar panel 16 can be minimized. Thus, for example, the solar panel 16 can be added as an option to the vehicle at a low cost.

(3) The auxiliary battery Ba, which is a lead-acid battery generally mounted on the vehicle, is used as a power storage device for temporarily storing the power generated by the solar panel 16. Thus, no additional device is required.

(4) The auxiliary battery Ba is charged by using the step-down chopper circuit 36. Thus, even when a variation in the output voltage Vs of the solar panel 16 occurs, the auxiliary battery Ba can be charged with a suitable charging current. The step-down chopper circuit 36 acts as a power converter in claims.

(5) The UECU 54, which acts as a second charging section in claims, is periodically powered ON and performs the charging process to charge the main battery Bm based on the terminal voltage Va of the auxiliary battery Ba. Thus, the power consumption can be reduced compared to when the UECU 54 remains ON at all times.

(6) When the output voltage Vs of the solar panel 16 becomes equal to or greater than the reference voltage Vref, the step-down unit 34 is powered ON to charge the auxiliary battery Ba (i.e., to temporarily store the power generated by the solar panel 16 in the auxiliary battery Ba). Thus, of all the electronic devices used to charge the main battery Bm, the comparator 40 is only powered ON when the output voltage Vs of the solar panel 16 is smaller than the reference voltage Vref.

Second Embodiment

A system according to a second embodiment of the present disclosure is described below with reference to FIG. 4. A difference between the first embodiment and the second embodiment is as follows.

Figure 4:
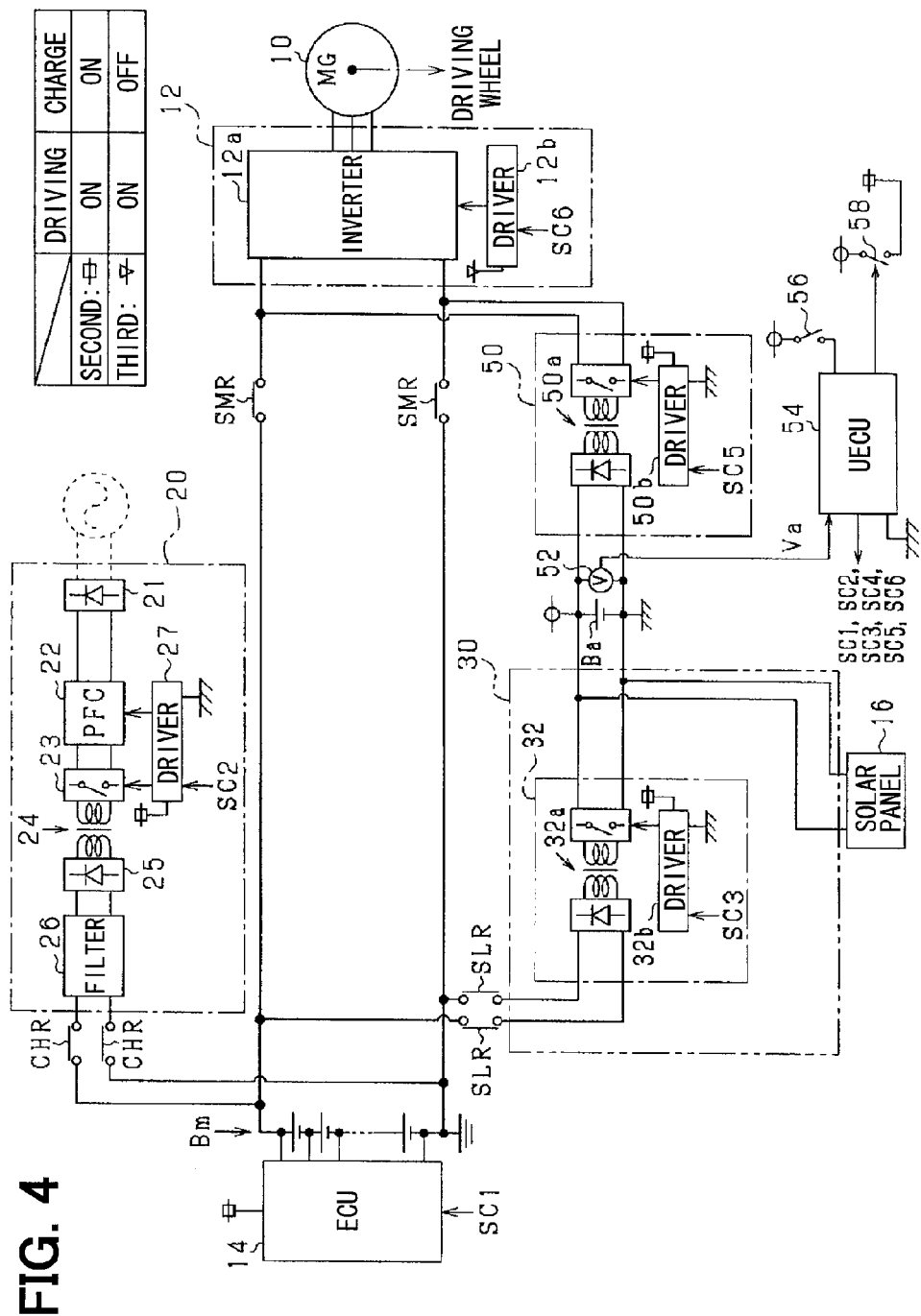
FIG. 4 is a diagram of a system according to a second embodiment of the present disclosure.

As shown in FIG. 4, in the second embodiment, the step-down unit 34 is eliminated so that the solar panel 16 can be connected directly to the auxiliary battery Ba. Therefore, the first charging section in claims is provided by connecting the positive and negative terminals of the auxiliary battery Ba to output terminals of the solar panel 16, respectively. Like in the first embodiment, while the vehicle is parked, the UECU 54 performs the charging process shown in FIG. 2 at a predetermined interval each time the UECU 54 is periodically powered ON.

Third Embodiment

A system according to a third embodiment of the present disclosure is described below with reference to FIG. 5. A difference between the first embodiment and the third embodiment is as follows.

Figure 5:
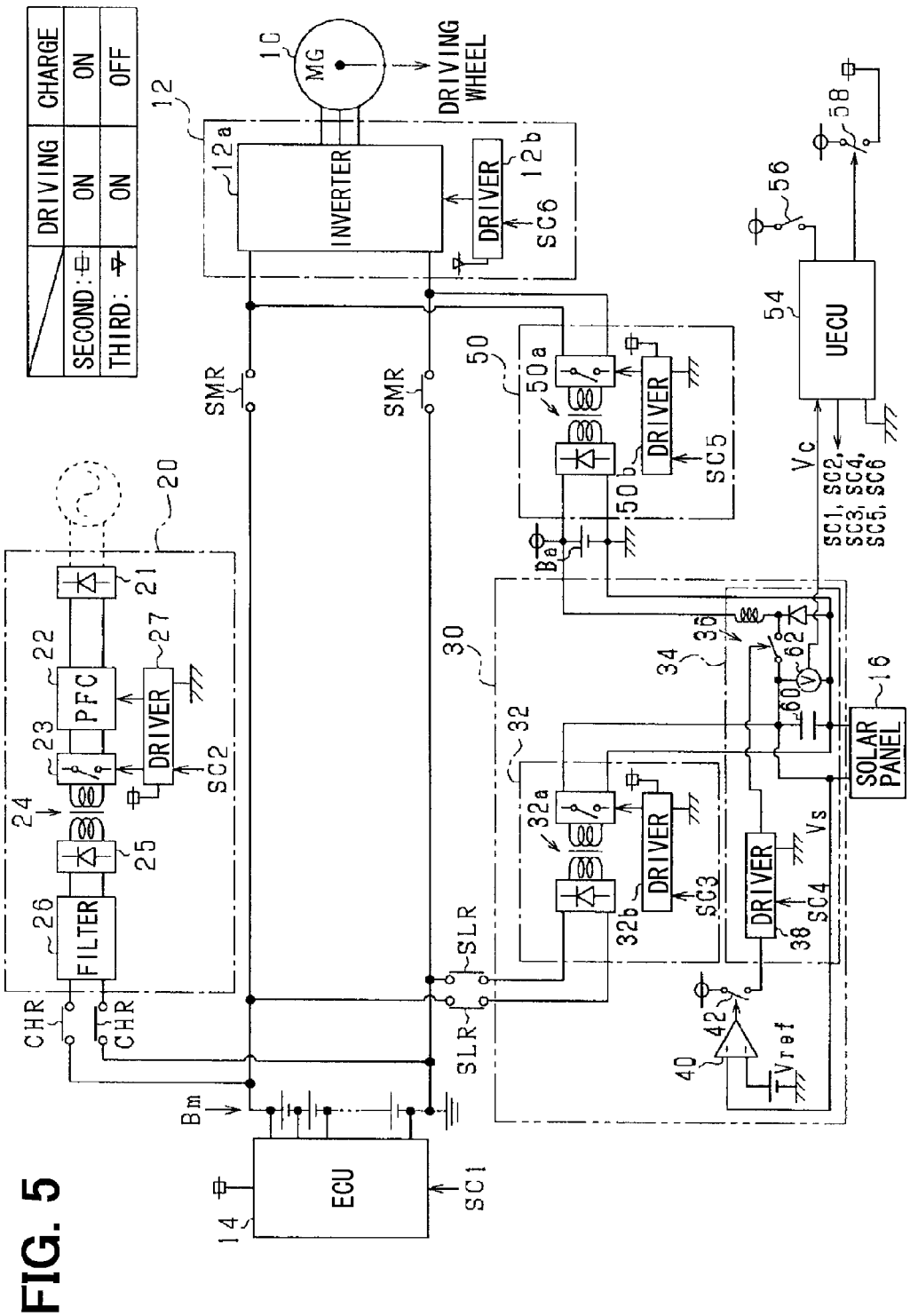
FIG. 5 is a diagram of a system according to a third embodiment of the present disclosure.

As shown in FIG. 5, according to the third embodiment, a capacitor 60 is connected to the solar panel 16. Further, the capacitor 60 is connected to an input terminal of the step-up circuit 32*a* and an input terminal of the step-down chopper circuit 36 of the step-down circuit 34. That is, the capacitor 60 can act as a power storage device for temporarily storing the power generated by the solar panel 16. It is noted that the first charging section in claims is provided by connecting positive and negative terminals of the capacitor 60 to the output terminals of the solar panel 16, respectively.

Fourth Embodiment

A system according to a fourth embodiment of the present disclosure is described below with reference to FIG. 6. A difference between the first embodiment and the fourth embodiment is as follows.

Figure 6:
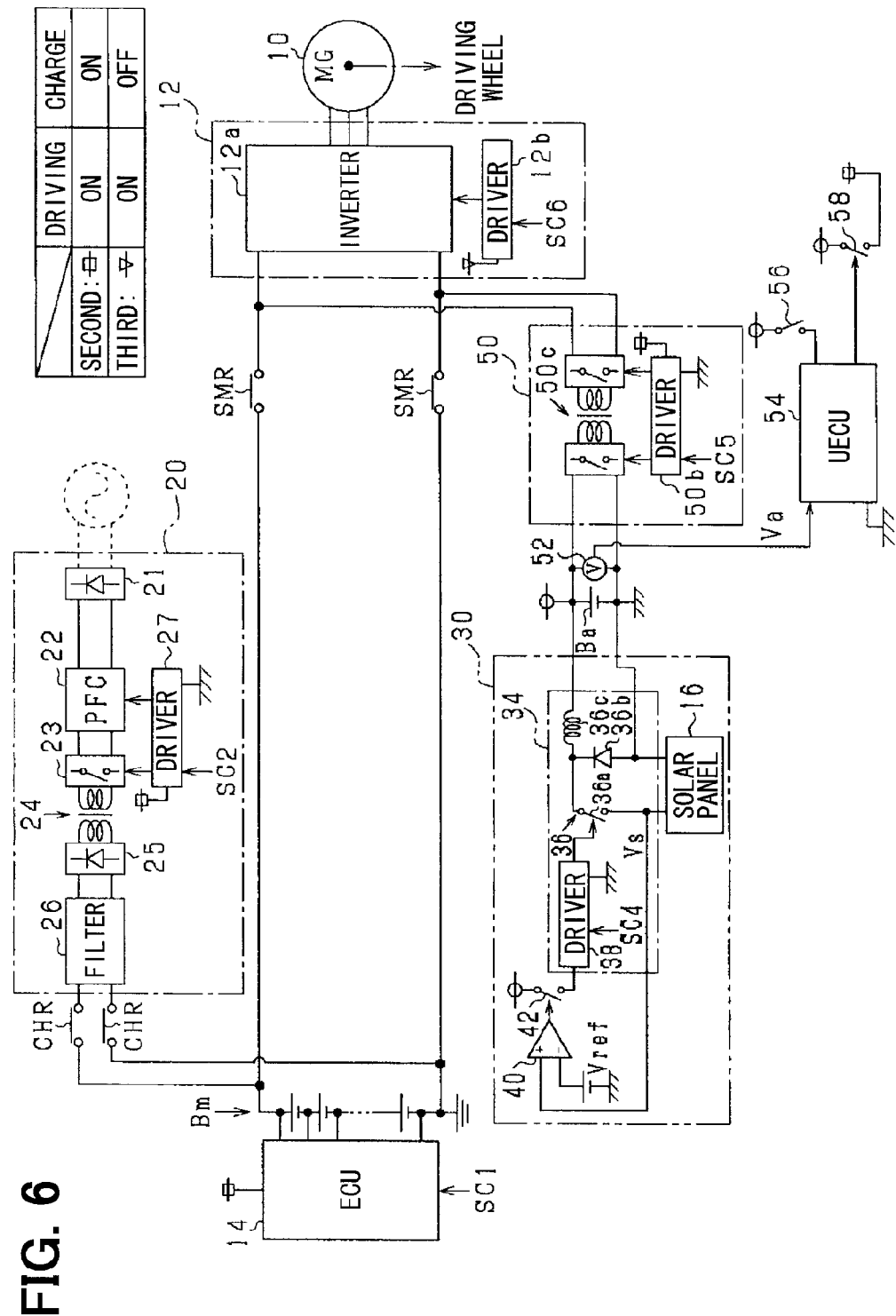
FIG. 6 is a diagram of a system according to a fourth embodiment of the present disclosure.

As shown in FIG. 6, according to the fourth embodiment, the SECU 30 does not have the step-up circuit 32. Further, the converter unit 50 has a bidirectional converter 50*c* instead of the DC-DC converter 50*a*. In FIG. 6, a symbol of a switching device is illustrated as a circuit of the bidirectional converter 50*c* for allowing power to be supplied from the auxiliary battery Ba to the main battery Bm. This is only one example, and a configuration of the bidirectional converter 50*c* is not limited to the symbol.

The bidirectional converter 50*c* can act as a step-up section in claims for charging the main battery Bm with the power generated by the solar panel 16. Therefore, the step-up unit 32 and the solar relay SLR can be eliminated.

Fifth Embodiment

A system according to a fifth embodiment of the present disclosure is described below with reference to FIG. 7. A difference between the first embodiment and the fifth embodiment is as follows.

Figure 7:
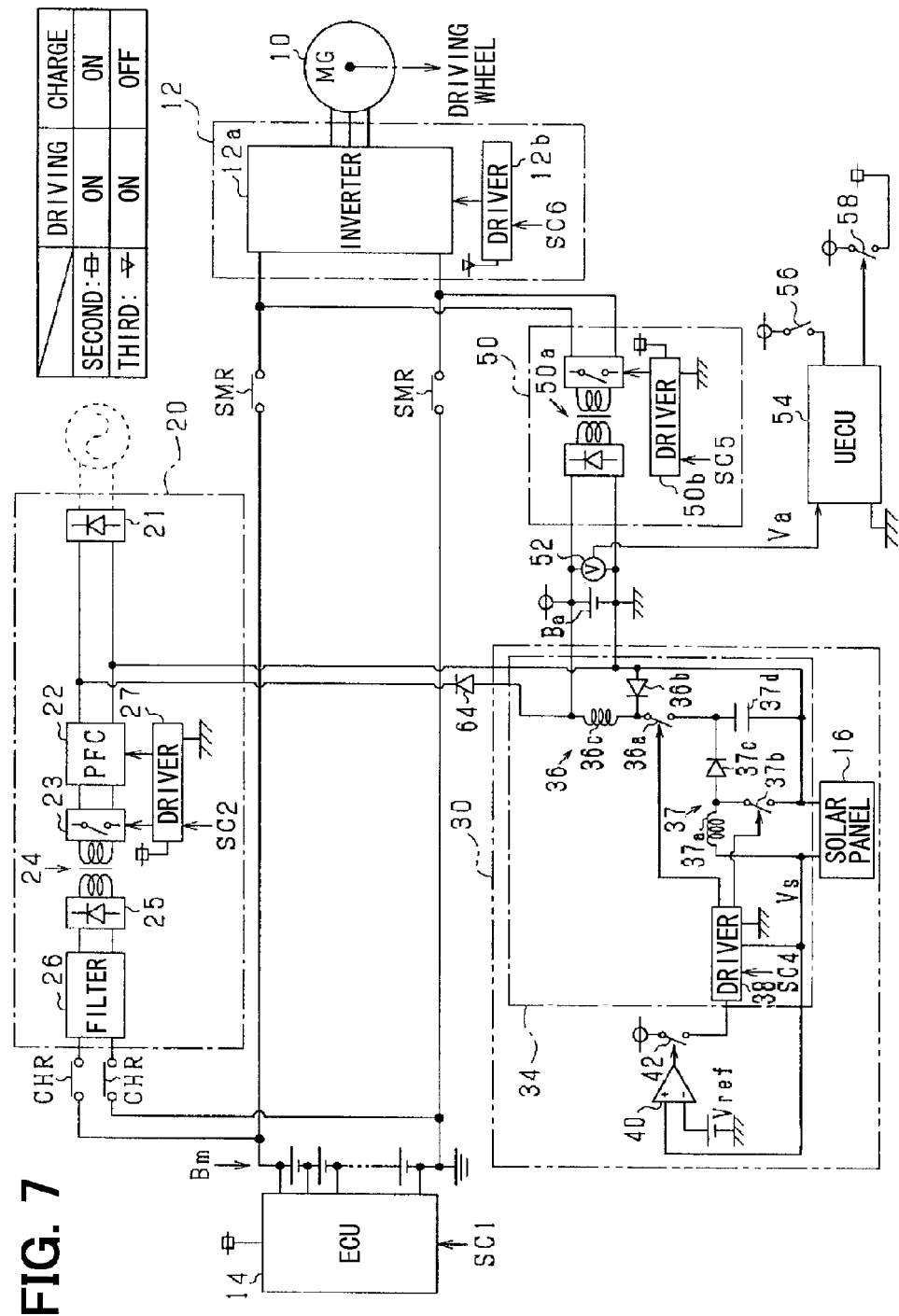
FIG. 7 is a diagram of a system according to a fifth embodiment of the present disclosure.

As shown in FIG. 7, according to the fifth embodiment, a charging circuit located in the charging unit 20 can act as a step-up section in claims for charging the main battery Bm with the power generated by the solar panel 16. Specifically, the auxiliary battery Ba is connected to the PFC circuit 22. For example, the PFC circuit 22 can be configured as a step-up chopper circuit. Therefore, the power stored in the auxiliary battery Ba can be stepped up by the PFC circuit 22 and then supplied to the main battery Bm through the bridge circuit 23, the transformer 24, the rectifier circuit 25, and the filter 26.

In such an approach, the main battery Bm can be charged with the power generated by the solar panel 16 without using the step-up unit 32 and the solar relay SLR.

Further, according to the fifth embodiment, the step-down unit 34 has a step-up chopper circuit 37 connected in series with the step-down shopper circuit 36. The step-up chopper circuit 37 includes an inductor 37*a*, a switching device 37*b*, a diode 37*c*, and a capacitor 37*d*. When the switching device 37*b* is turned ON, electric current flows through a closed circuit constructed with the solar panel 16, the inductor 37*a*, and the switching device 37*b* so that energy stored in the inductor 37*a* can be increased. Then, when the switching device 37*b* is turned OFF, the energy stored in the inductor 37*a* is discharged through a closed circuit constructed with the solar panel 16, the inductor 37*a*, the diode 37*c*, and the capacitor 37*d*. It is noted that the switching device 37*b* is operated by the driver 38.

This approach can improve the charging efficiency of the solar panel 16 for the following reasons. The charging efficiency of the solar panel 16 varies depending on an output current of the solar panel 16. Assuming that the step-down chopper circuit 36 is connected directly to the solar panel 16, the output current of the solar panel 16 increases from zero each time the switching device 36*a* of the step-down chopper circuit 36 is turned ON, and the output current of the solar panel 16 decreases to zero each time when the switching device 36*a* is turned OFF. Therefore, the step-down chopper circuit 36 is connected directly to the solar panel 16, the charging efficiency is degraded. In contrast, when the step-up chopper circuit 37 is connected to the output terminals of the solar panel 16, the output current of the solar panel 16 is maintained above zero during an ON/OFF operation of the switching device 37*b* of the step-up chopper circuit 37. Further, since the amount of variation in an output current of the step-up chopper circuit 37 can be adjusted by adjusting an inductance of the inductor 37*a*, the charging efficiency can be kept high.

Specifically, the driver 38 controls a voltage applied to the auxiliary battery Ba so that the output voltage Vs of the solar panel 16 can be feedback-controlled to a target voltage. For example, the driver 38 can control the voltage applied to the auxiliary battery Ba by adjusting a duty ratio of a drive signal applied to the switching device 37*b* of the step-up chopper circuit 37 and a duty cycle of a drive signal applied to the switching device 36*a* of the step-down chopper circuit 36. As it is well known, the duty cycle is a ratio of "ON" time over the complete switching cycle of the switching device. Thus, the output voltage Vs of the solar panel 16 is feedback-controlled to the target voltage so that the charging efficiency can be kept high.

Accordingly, use efficiency of the power generated by the solar panel 16 is improved. For example, the probability, in which the power generated by the solar panel 16 exceeds power consumed by electronic devices that are powered ON upon turn-ON of the local power switch 42, can be increased. Generally, it is difficult to set the reference voltage Vref in such a manner that the local power switch 42 is turned ON when the power generated by the solar panel 16 exceeds the power to be consumed by electronic devices that are powered ON upon turn-ON of the local power switch 42.

Sixth Embodiment

A system according to a sixth embodiment of the present disclosure is described below with reference to FIG. 8. A difference between the first embodiment and the sixth embodiment is as follows.

Figure 8:
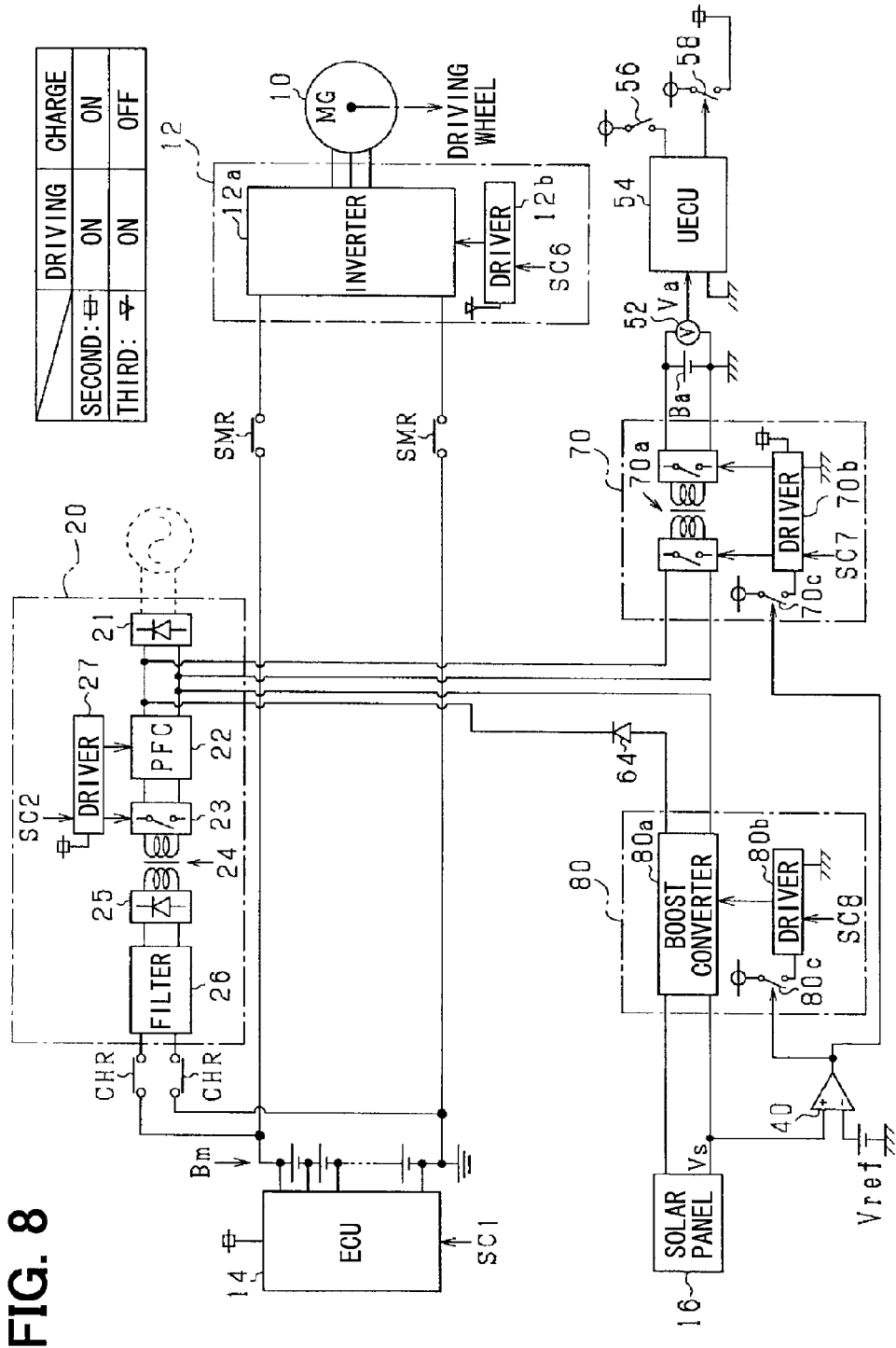
FIG. 8 is a diagram of a system according to a sixth embodiment of the present disclosure.

According to the sixth embodiment, as shown in FIG. 8, the system includes a converter unit 70 connected to the charging unit 20. The converter unit 70 steps down power supplied from the external power source and outputs the stepped down power to the auxiliary battery Ba. The converter unit 70 includes a DC-DC converter 70*a* and a driver 70*b* for controlling and driving the DC-DC converter 70*a*. The DC-DC converter 70*a* can act as a charging circuit for the auxiliary battery Ba. The DC-DC converter 70*a* is connected to the output terminal of the rectifier circuit 21. An output power of the rectifier circuit 21 is stepped down by the rectifier circuit 21 and then applied to the auxiliary battery Ba. According to the sixth embodiment, the DC-DC converter 70*a* is configured as a bidirectional converter. The converter unit 70 can act as an auxiliary charger in claims.

Further, according to the sixth embodiment, the system includes a step-up unit 80. The output voltage Vs of the solar panel 16 is stepped up by the step-up unit 80 and then supplied to the DC-DC converter 70*a*. The step-up unit 80 includes a step-up circuit (i.e., boost converter) 80*a* and a driver 80*b* for controlling and driving the step-up circuit 80*a*. The step-up circuit 80*a* is connected between the output terminals of the solar panel 15 and input terminals of the DC-DC converter 70*a*. The step-up circuit 80*a* serves to reduce a difference in an input voltage of the DC-DC converter 70*a* between when the input voltage is applied by the rectifier circuit 21 and when the input voltage is applied by the step-up circuit 80*a*. The step-up circuit 80*a* also serves to maintain the output voltage Vs of the solar panel 16 above the terminal voltage Va of the auxiliary battery Ba. It is noted that a diode 64 is connected between the step-up circuit 80*a* and the DC-DC converter 70*a*. The diode 64 prevents an electric current from flowing in a direction from the rectifier circuit 21 to the step-up circuit 80*a*.

Each of the driver 80*b* of the step-up unit 80 and the driver 70*b* of the converter unit 70 are powered ON, when the output voltage Vs of the solar panel 16 becomes equal to or greater than the reference voltage Vref. Specifically, the driver 80*b* is connected to the auxiliary battery Ba through a local power switch 80*c*, and the driver 70*b* is connected to the auxiliary battery Ba through a local power switch 70*c*. The local power switches 70*c* and 80*c* are turned ON and OFF according to the output signal of the comparator 40.

Also when the second power switch 58 is turned ON, the driver 70*b* is powered ON. That is, according to the sixth embodiment, a power source for the driver 70*b* is added to charge the battery Bm with the power generated by the solar panel 16. Specifically, only the step-up unit 80 and the local power switch 70*c* are added to charge the battery Bm with the power generated by the solar panel 16. Thus, the change of design and the number of parts added to charge the battery Bm with the power generated by the solar panel 16 are limited as much as possible.

The step-up circuit 80*a* of the step-up unit 80 can be a non-isolated converter. In this case, there is no need to add a relay between the step-up unit 80 and the charging unit 20, because the transformer 24 of the charging unit 20 can serve as an isolator for isolating the solar panel 16 side from the main battery Bm side.

For example, the step-up chopper circuit 37 can be used as the step-up circuit 80*a*. Alternatively, the step-up circuit 80*a* can be an isolated converter.

Seventh Embodiment

A system according to a seventh embodiment of the present disclosure is described below with reference to FIG. 9. A difference between the first embodiment and the seventh embodiment is as follows.

According to the sixth embodiment, the system includes a current sensor 90 and an integrator 92. The current sensor 90 detects charging and discharging current of the auxiliary battery Ba. The integrator 92 is located in the step-down unit 34 and calculates an integral value In of the current detected by the current sensor 90. The integral value In calculated by the integrator 92 is outputted to the UECU 54. The UECU 54 performs a charging process to charge the main battery Bm based on the integral value In.

Figure 10:
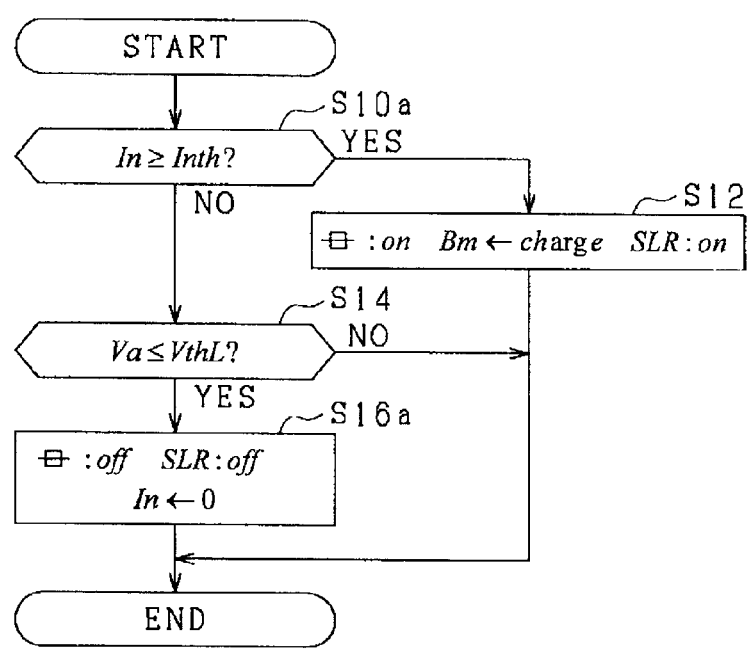
FIG. 10 is a flow chart of a charging process to charge a main battery according to the seventh embodiment.

FIG. 10 shows the charging process according to the seventh embodiment. While the vehicle is parked, the UECU 54 performs the charging process at a predetermined interval each time the UECU 54 is periodically powered ON. In FIGS. 2 and 10, the same step number corresponds to the same process.

The charging process starts at S10*a* where the UECU 54 determines whether the integral value In is equal to or greater than a predetermined threshold value Inth. The process performed at S10*a* corresponds to the process performed at S10 in FIG. 2. Assuming that the current sensor 90 has no detection error, the UECU 54 can detect the amount of the power, which is stored in the auxiliary battery Ba by the solar panel 16, more accurately based on the integral value In than on the terminal voltage Va. A first reason for this is that the terminal voltage Va depends on not only the amount of power stored in the auxiliary battery Ba by the solar panel 16 but also the SOC of the auxiliary battery Ba before the charging process. A second reason for this is that the terminal voltage Va is polarized depending on a charging and discharging history of the auxiliary battery Ba.

Like at S16 of FIG. 2, at S16*a*, the UECU 54 turns OFF both the second power switch 58 and the solar relay SLR. Further, at S16*a*, the UECU 54 initializes the integrator 92 by sending an initialization command to the SECU 30.

Eighth Embodiment

A system according to an eighth embodiment of the present disclosure is described below with reference to FIG. 11. A difference between the first embodiment and the eighth embodiment is as follows.

Like in the fifth embodiment shown in FIG. 7, the step-down unit 34 has a step-up chopper circuit 37 connected in series with the step-down shopper circuit 36, and the auxiliary battery Ba is charged by feedback-controlling the output voltage Vs to a target voltage. Further, according to the eighth embodiment, a current sensor 38*a* for detecting the output current of the solar panel 16 is connected between the solar panel 16 and the series circuit of the step-down shopper circuit 36 and the step-up chopper circuit 37.

Figure 12:
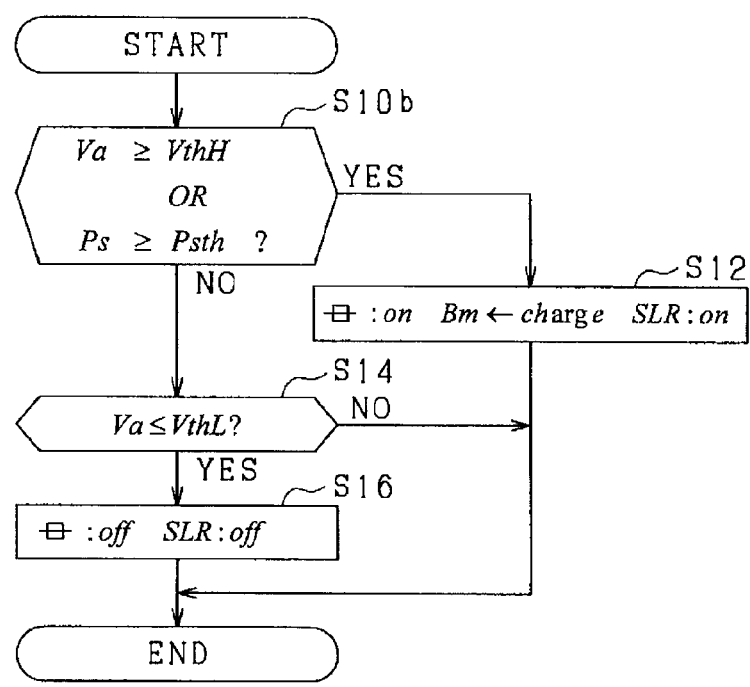
FIG. 12 is a flow chart of a charging process to charge a main battery according to the eighth embodiment.

FIG. 12 shows a charging process to charge the main battery Bm according to the eighth embodiment. While the vehicle is parked, the UECU 54 performs the charging process at a predetermined interval each time the UECU 54 is periodically powered ON. In FIGS. 2 and 12, the same step number corresponds to the same process.

The charging process starts at S10*b* where the UECU 54 determines whether a logical disjunction between two conditions is true or false. The first condition is that the terminal voltage Va of the auxiliary battery Ba is equal to or greater than the charging start threshold VthH. The second condition is that the output power Ps of the solar panel 16 is equal to or greater than a predetermined threshold Psth. The process performed at S10*b* corresponds to the process performed at S10 in FIG. 2. The second condition is used to reduce wear of the solar relay SLR.

That is, assuming that the charging process is performed upon satisfaction of the first condition only, the charging process is stopped when the first condition becomes unsatisfied due to the fact that the terminal voltage of the auxiliary battery Ba decreases with progress of the charging process. In this case, the solar relay SLR is generally turned OFF (i.e., opened) for isolation. However, if the output power Ps of the solar panel 16 is large, the first condition becomes satisfied again in a short time so that the solar relay SLR can be turned OFF. In this way, the solar relay SLR may be frequently turned ON and OFF so that the wear of the solar relay SLR may be accelerated.

The output power Ps of the solar panel 16 can be calculated as a product of the output voltage Vs of the solar panel 16 and the output current detected by the current sensor 38*a*.

Ninth Embodiment

A system according to a ninth embodiment of the present disclosure is described below with reference to FIG. 13. A difference between the first embodiment and the ninth embodiment is as follows.

Figure 13:
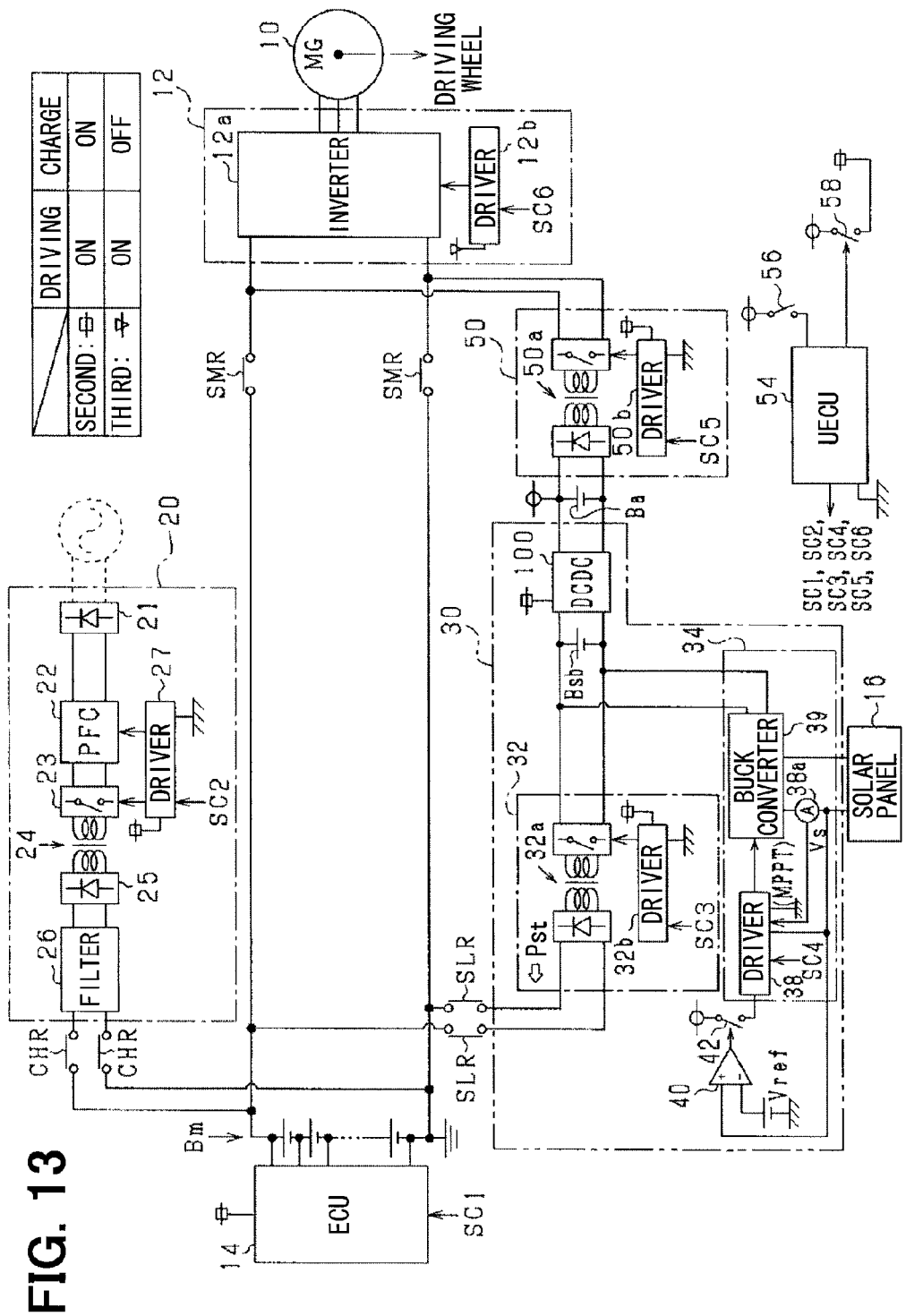
FIG. 13 is a diagram of a system according to a ninth embodiment of the present disclosure.

As shown in FIG. 13, according to the ninth embodiment, the step-down unit 34 includes a step-down converter (i.e., buck converter) 39. For example, the step-down converter 39 can be constructed with the step-up chopper circuit 37 and the step-down shopper circuit 36 shown in FIG. 7. The driver 38 controls the step-down converter 39 based on the output current and the output voltage Vs of the solar panel 16, thereby performing a maximum power point tracking control (MPPT). The output current of the solar panel 16 can be detected by the current sensor 38a. The driver 38 can act as a maximum power point tracking controller in claims.

Further, according to the ninth embodiment, a sub-battery Bsb instead of the auxiliary battery Ba is used as a power storage device for temporarily storing the power which is generated by the solar panel 16 and outputted from the step-down converter 39. The sub-battery Bsb is a nickel hydride secondary battery. Thus, the sub-battery Bsb can store the power generated by the solar panel 16 with a high degree of reliability and also improve the use efficiency of the power generated by the solar panel 16. That is, since the auxiliary battery Ba is a lead-acid battery, the reliability of the auxiliary battery Ba may be degraded due to a variation of the SOC. Therefore, when the main battery Bm is charged with the power stored in the auxiliary battery Ba, the amount of power supplied from the auxiliary battery Ba to the main battery Bm in each charging process needs to be reduced to ensure the reliability of the auxiliary battery Ba. In contrast, the sub battery Bsb, which is a nickel hydride secondary battery, is resistant to the variation of the SOC. Therefore, when the main battery Bm is charged with the power stored in the sub-battery Bsb, a large amount of power can be supplied from the sub-battery Bsb to the main battery Bm in each charging process. Accordingly, a frequency at which the solar relay SLR is tuned ON and OFF can be reduced so that wear of the solar relay SLR can be reduced.

Further, according to the ninth embodiment, a DC-DC converter 100 is connected between the sub-battery Bsb and the auxiliary battery Ba. Although not shown in the drawings, the DC-DC converter 100 includes a converter circuit and a driver for controlling and driving the converter circuit. The DC-DC converter 100 operates on the second power source which is turned ON when the second power switch 58 is turned ON.

FIG. 12 shows a charging process to charge the main battery Bm according to the ninth embodiment. While the vehicle is parked, the UECU 54 performs the charging process at a predetermined interval each time the UECU 54 is periodically powered ON.

The charging process starts at S20, where the UECU 54 determines whether a state of charge SOC (Bsb) of the sub-battery Bsb is equal to or greater than a predetermined threshold value SthH. That is, at S20, the UECU 54 determines whether the amount of the power stored in the sub-battery Bsb by the solar panel 16 reaches a value high enough to charge the main battery Bm. If the SOC (Bsb) is equal to or greater than the threshold value SthH corresponding to YES at S20, the charging process proceeds to S22.

At S22, the UECU 54 turns ON the second power switch 58, turns ON the solar relay SLR, and sets a command value Pst* for the output power Pst of the step-up unit 32 to a predetermined value Pst0 which is greater than 0 (i.e., Pst0>0). The command value Pst* is set greater than the terminal voltage of the auxiliary battery Ba observed when the SOC of the auxiliary battery Ba is reduced to a level that can degrade the reliability of the auxiliary battery Ba. In such an approach, even when the power consumed by the electronic devices are increased due to the fact that the second power switch 58 is turned ON, an excessive reduction in the SOC of the auxiliary battery Ba is avoided so that the reliability of the auxiliary battery Ba can be maintained.

After S22, the charging process proceeds to S24, where the UECU 54 increments a count value T of a counter which measures a duration of the charging process. After S24, the charging process proceeds to S26, where the UECU 54 determines whether a logical disjunction between two conditions is true or false. The first condition is that the SOC (Bsb) of the sub-battery Bsb is equal to or less than a threshold value SthL. The second condition is that the count value T is equal to or greater than a threshold time Tth. The process performed at S26 is used to determine whether to stop the charging process. The threshold value SthL is set so that when the sub-battery Bsb is adequately discharged, the SOC(Bsb) of the sub-battery Bsb reaches the threshold value SthL. The threshold time Tth is set so that when the power generated by the solar panel 16 reaches a possible maximum value, it takes the threshold time Tth to adequately discharge the power stored in the sub-battery Bsb. The object of using the threshold time Tth is to protect the sub-battery Bsb from overdischarge by preventing the charging process from continuing improperly due to, for example, a calculation error of the SOC(Bsb).

If the UECU 54 determines that the logical disjunction is true corresponding to YES at S26, the charging process proceeds to S28. At S28, the UECU 54 turns OFF the second power switch 58, turns OFF the solar relay SLR, stops the output of the step-up unit 32, and stops the supply of power to the auxiliary battery Ba.

After S28, or if the SOC (Bsb) is less than the threshold value SthH corresponding to NO at S20, the charging process ends.

Tenth Embodiment

A system according to a tenth embodiment of the present disclosure is described below with reference to FIG. 15. A difference between the first embodiment and the tenth embodiment is as follows.

Figure 14:
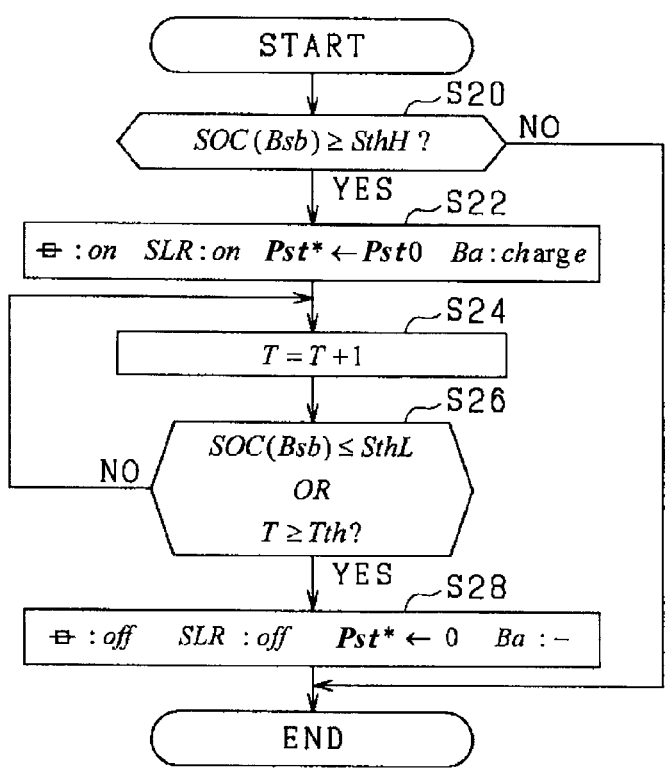
FIG. 14 is a flow chart of a charging process to charge a main battery according to the ninth embodiment.
Figure 15:
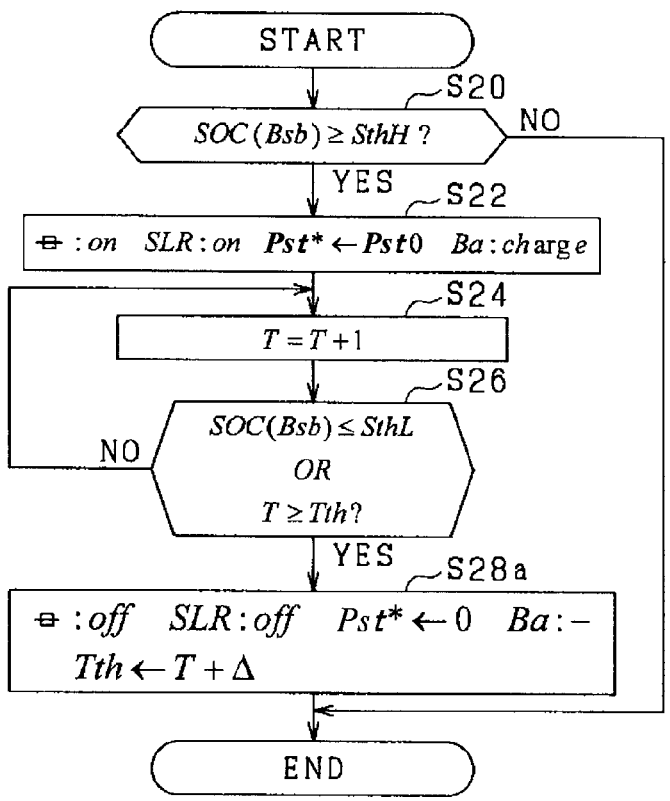
FIG. 15 is a flow chart of a charging process to charge a main battery according to a tenth embodiment of the present disclosure.

FIG. 15 shows a charging process to charge the main battery Bm according to the tenth embodiment. While the vehicle is parked, the UECU 54 performs the charging process at a predetermined interval each time the UECU 54 is periodically powered ON. In FIGS. 14 and 15, the same step corresponds to the same process.

Like at S28 of FIG. 14, at S28a, the UECU 54 turns OFF the second power switch 58, turns OFF the solar relay SLR, stops the output of the step-up unit 32, and stops the supply of power to the auxiliary battery Ba. Further, at S28a, the UECU 54 changes the threshold time Tth to a value which is calculated by adding a margin time $\Delta$ to the count value T. The process performed at S28a is used to learn a time length suitable for the threshold time Tth. For example, due to a variation in the amount of sunlight, the present count value T may deviate from a time length that allow the power stored in the sub-battery Bsb to be adequately discharged in the next charging process of the main battery Bm. The margin time $\Delta$ is set in consideration of the deviation of the count value T.

It is preferable that the threshold time Tth should have a default value. In this case, if the time elapsed from the previous charging process to the present charging process of the main battery Bm is too long, the default value can be used instead of the leaned value.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

(Modification of Integrator)

Figure 9:
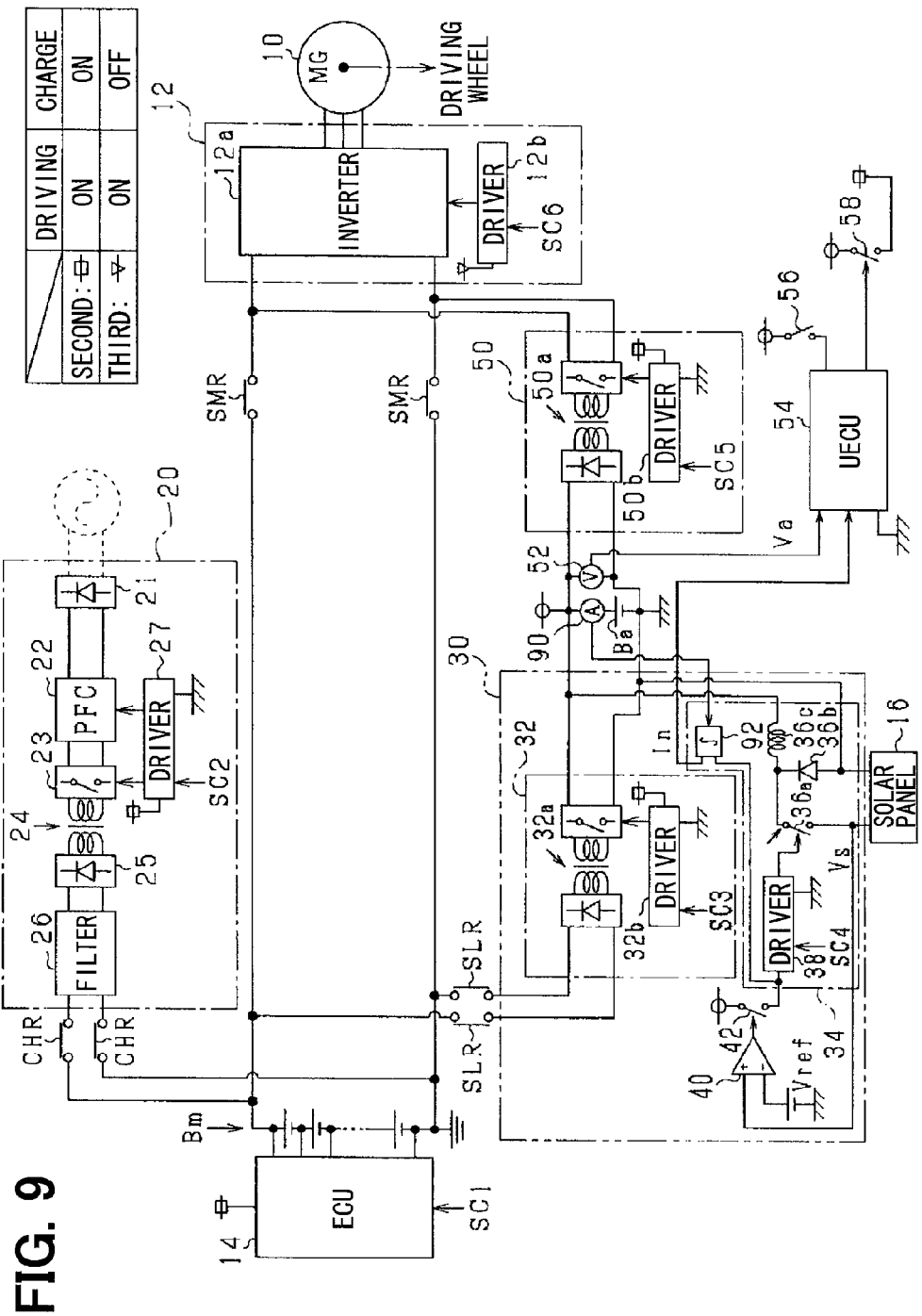
FIG. 9 is a diagram of a system according to a seventh embodiment of the present disclosure.

The integrator 92 is not limited to that described in the seventh embodiment shown in FIG. 9. For example, the integrator 92 can be located outside the step-down unit 34 rather than inside the step-up down 34. That is, the integrator 92 can be added to the step-down unit 34 as an external part. Even in this case, the integrator 92 operates on a power source independent of the first and second power sources.

In the seventh embodiment, the integrator 92 calculates the integral value In of the current by detected by the current sensor 90. Alternatively, the current can be obtained by a method other than a current sensor. For example, the current can be calculated from the output voltage Vs of the solar panel 16, the terminal voltage Va of the auxiliary battery Ba, and the duty cycle of the drive signal applied to the switching device 36a. Even in this case, the integrator 92 operates on a power source independent of the first and second power sources.

(Modification of First Charging Section)

The driver 38 can be powered ON by a method other than the local power switch 42. For example, a power terminal of the driver 38 can be connected to the output terminal so that the driver 38 can use the solar panel 16 as a power source.

(Modification of Power Converter)

Figure 11:
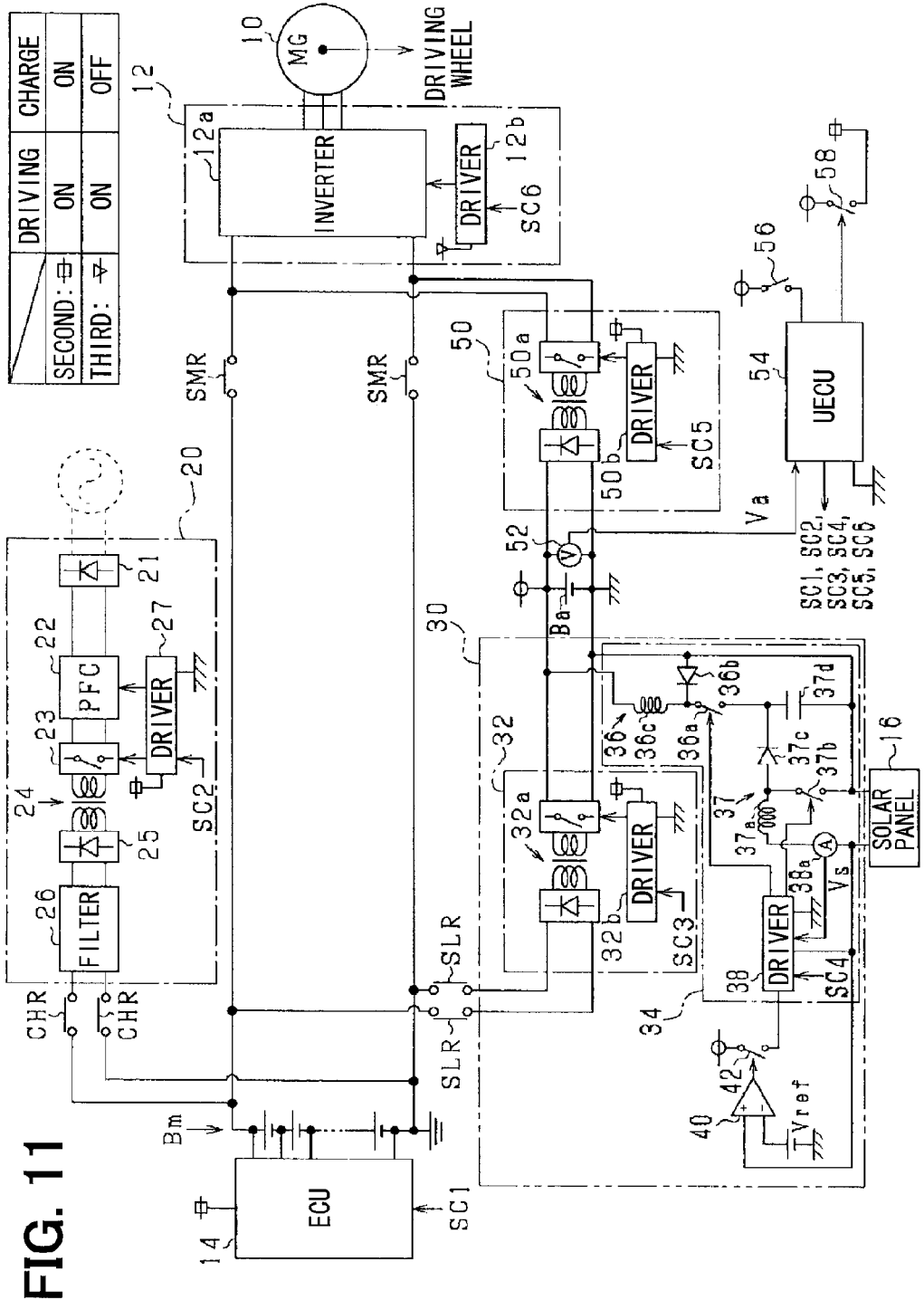
FIG. 11 is a diagram of a system according to an eighth embodiment of the present disclosure.

In the fifth embodiment shown in FIG. 7 and the eighth embodiment shown in FIG. 11, the step-down unit 34 can be used as a step-up circuit. In such an approach, even when the output voltage Vs of the solar panel 16 is not greater than the terminal voltage Va of the auxiliary battery Ba, the output voltage Vs is stepped up so that the auxiliary battery Ba can be charged. To increase a chance to charge the auxiliary battery Ba, it is preferable that the power converter should have both a function to generate an output voltage by stepping up an input voltage and a function to generate an output voltage by stepping down an input voltage.

(Modification of Determining Section)

To periodically power ON the SECU 30, the determining section can determine whether the output voltage Vs of the solar panel 16 is equal to or greater than the reference voltage Vref. In this case, the SECU 30 can be powered ON each time the determining section determines that the output voltage Vs of the solar panel 16 is equal to or greater than the reference voltage Vref. Further, each time the SECU 30 is powered ON, the determining section can determine whether the output voltage Vs of the solar panel 16 is equal to or greater than the reference voltage Vref. Further, for example, each time the UECU 54 is powered ON, the determining section can determine whether the output voltage Vs of the solar panel 16 is equal to or greater than the reference voltage Vref.

Even when the determining section determines that the output voltage Vs of the solar panel 16 is equal to or greater than the reference voltage Vref, the solar panel 16 can be prohibited from generating the power on condition that the SOC of the main battery Bm is high.

For example, the determining section can be eliminated by connecting the output terminal of the solar panel 16 to a regulator and by applying an output voltage of the regulator to the driver 38. Further, a user can power ON and OFF the driver 38. In this case, when the user powers ON the driver 38, the driver 38 can be kept ON to charge the power storage device regardless of whether the output voltage Vs of the solar panel 16 is greater or less than the reference voltage Vref.

(Modification of Second Charging Section)

In the embodiments, the charging process to charge the main battery Bm is performed by the UECU 54. Alternatively, an apparatus other than the UECU 54 can perform the charging process. For example, the SECU 30 can perform the charging process.

The second charging section can determine whether to stop the charging process based on a value other than the terminal voltage Va and the integral value In. For example, in the seventh embodiment, the second charging section can determine to stop the charging process, when an increase in the SOC of each battery cell of the main battery Bm reaches a predetermined value which is calculated base on the amount of power stored in the auxiliary battery Ba. In this case, the increase in the SOC of each battery cell of the main battery Bm can be calculated by the battery ECU 14, and the amount of power stored in the auxiliary battery Ba can be calculated based on the integral value In calculated by the integrator 92.

While the second charging section charges the main battery Bm, the solar panel 16 can stop charging the auxiliary battery Ba.

(Modification of Main Charger)

An isolator of the main charger is not limited to the transformer 24. For example, a flying capacitor can be used instead of the transformer 24.

(Modification of Auxiliary Charger)

The auxiliary charger is not limited to the converter unit 70 having the bidirectional DC-DC converter 70a. For example, the auxiliary charger can transmit power in a direction from the external power source to the auxiliary battery Ba, but cannot transmit power in a direction from the auxiliary battery Ba to the external power source.

(Modification of Main Battery Bm)

The main battery Bm is not limited to a lithium-ion secondary battery. Even when the main battery Bm is different from a lithium-ion secondary battery, the battery ECU 14 needs to be powered ON as long as the reliability of the main battery Bm is degraded, for example, due to variations in the SOC, the terminal voltage, or the like. Therefore, the present disclosure can be effectively applied even when the main battery Bm is different from a lithium-ion secondary battery.

It is not always essential that the main battery Bm is isolated from the chassis of the vehicle. For example, when the main battery Bm is configured to output a large current to reduce the terminal voltage, the potential of the negative terminal can be the potential of the chassis. In this case, there is no need to use an isolated converter as a power converter for exchanging power between the main battery Bm and others.

(Modification of Auxiliary Battery Ba)

The auxiliary battery Ba is not limited to a lead-acid battery. For example, the auxiliary battery Ba can be a nickel-hydride secondary battery.

(Modification of Sub-Battery Bsb)

The sub-battery Bsb is not limited to a nickel-hydride secondary battery. For example, the sub-battery Bsb can be a lithium-ion secondary battery.

(Others)

Even when the vehicle is running, the power generation efficiency of the solar panel 16 can be improved by charging the power storage device using the power converter rather than by directly charging the power storage device with the power generated by the solar panel 16. In this way, according to the present disclosure, controllability of the power generation can be improved.

What is claimed is:

1. A charge controller for a vehicle equipped with a rotating machine, a main battery having a first maximum storage capacity for storing electrical power supplied to the rotating machine, a power storage device having a second maximum storage capacity smaller than the first maximum storage capacity, and a solar power generator, the charge controller comprising:
 a power converter interposed between the solar power generator and the power storage device;
 a first charging section configured to control the power converter to store electrical power generated by the solar power generator in the power storage device;
 a step-up section configured to step up and output the power stored in the power storage device to the main battery;
 a second charging section configured to control the step-up section to charge the main battery with the power stored in the power storage device;
 while the first charging section stores the power generated by the solar power generator in the power storage device, the second charging section controls the step-up section to step up the sum of:
  the power stored in the power storage device, and
  an output power of the power converter; and
 the power stored in the power storage device and the output power of the power converter being inputted to the step-up section;
 the power storage device is charged without powering ON an electronic device to monitor a state of charge of the power storage device; and
 a control section, which acts as the second charging section, is periodically powered ON and performs a charging process to charge the main battery based on a terminal voltage of the power storage device.

2. The charge controller according to claim 1, wherein
 when the vehicle is parked, the second charging section charges the main battery with the power stored in the power storage device by powering ON a second number of electronic devices mounted on the vehicle,
 when the vehicle is parked, the first charging section stores the power generated by the solar power generator in the power storage device by powering ON a first number of the electronic devices, and
 the first number is smaller than the second number so that power consumption is smaller when the first charging section stores the power generated by the solar power generator in the power storage device than when the second charging section charges the main battery with the power stored in the power storage device.

3. The charge controller according to claim 1, wherein
 the first charging section includes a maximum power point tracking controller for performing a maximum power point tracking control by controlling the power converter,
 the second charging section controls an output power of the step-up section to a command value, and
 the command value is different from an output power of the power converter.

4. The charge controller according to claim 1, wherein
 the first charging section stores the power generated by the solar power generator in the power storage device regardless of a state of charge of the main battery.

5. The charge controller according to claim 1, wherein
 when the vehicle is parked, the second charging section charges the main battery with the power stored in the power storage device regardless of an output voltage of the solar power generator.

6. The charge controller according to claim 1, wherein
 the power converter maintains an electric current inputted from the solar power generator above zero during a period of time when the power converter outputs an electric current to the power storage device.

7. The charge controller according to claim 1, wherein
 the power storage device is an auxiliary battery.

8. The charge controller according to claim 1, wherein
 when the vehicle is parked, the second charging section is periodically powered ON, and
 each time the second charging section is periodically powered ON, the second charging section detects the amount of the power stored in the power storage device, and
 when the amount of the power stored in the power storage device is equal to or greater than a predetermined reference value, the second charging section charges the main battery with the power stored in the power storage device.

9. The charge controller according to claim 1, wherein
 the first charging section includes an integrator for calculating an integral value of a charging current to the power storage device, and
 the second charging section charges the main battery with the power stored in the power storage device based on the integral value.

10. The charge controller according to claim 1, further comprising:
 a determining section configured to determine whether an output voltage of the solar power generator is equal to or greater than a predetermined reference voltage, wherein
 when the determining section determines that the output voltage of the solar power generator is equal to or greater than the reference voltage, the first charging section starts to store the power generated by the solar power generator in the power storage device.

11. The charge controller according to claim 1, further comprising:
 a charger configured to be connected to an external power source to charge the main battery with power from the external power source, wherein
 the charger includes a step-up circuit acting as the step-up section.

12. The charge controller according to claim 1, wherein
 the power storage device is an auxiliary battery, and
 the step-up section is a bidirectional converter for exchanging power between the main battery and the auxiliary battery.

13. The charge controller according to claim 1, further comprising:
 a main charger configured to be connected to an external power source to charge the main battery with power from the external power source, and an auxiliary charger configured to charge the power storage device with the power from the external power source, wherein the power storage device is an auxiliary battery, the main charger has an isolator for transmitting power between a primary side and a secondary side of the isolator by isolating the primary side and the secondary side, the auxiliary charger has a function to step down and apply a voltage on the primary side to the auxiliary battery, the first charging section includes a step-up circuit, a control section, and the auxiliary charger, the step-up circuit steps up and apply an output voltage of the solar power generator to the auxiliary charger, the control section electronically controls the step-up circuit and the auxiliary charger, and the step-up section includes the main charger and the auxiliary charger.

14. The charge controller according to claim 1, wherein the second charging section stops charging the main battery with the power stored in the power storage device based on a terminal voltage of the power storage device.

15. The charge controller according to claim 1, further comprising:

a switch configured to connect and disconnect the main battery to and from the step-up section, wherein when an output power of the solar power generator is greater than a predetermined reference value, the switch keeps the main battery connected to the step-up section so that the main battery is charged with the power stored in the power storage device while the power generated by the solar power generator is stored in the power storage device.

* * * * *